UNITED STATES PATENT OFFICE.

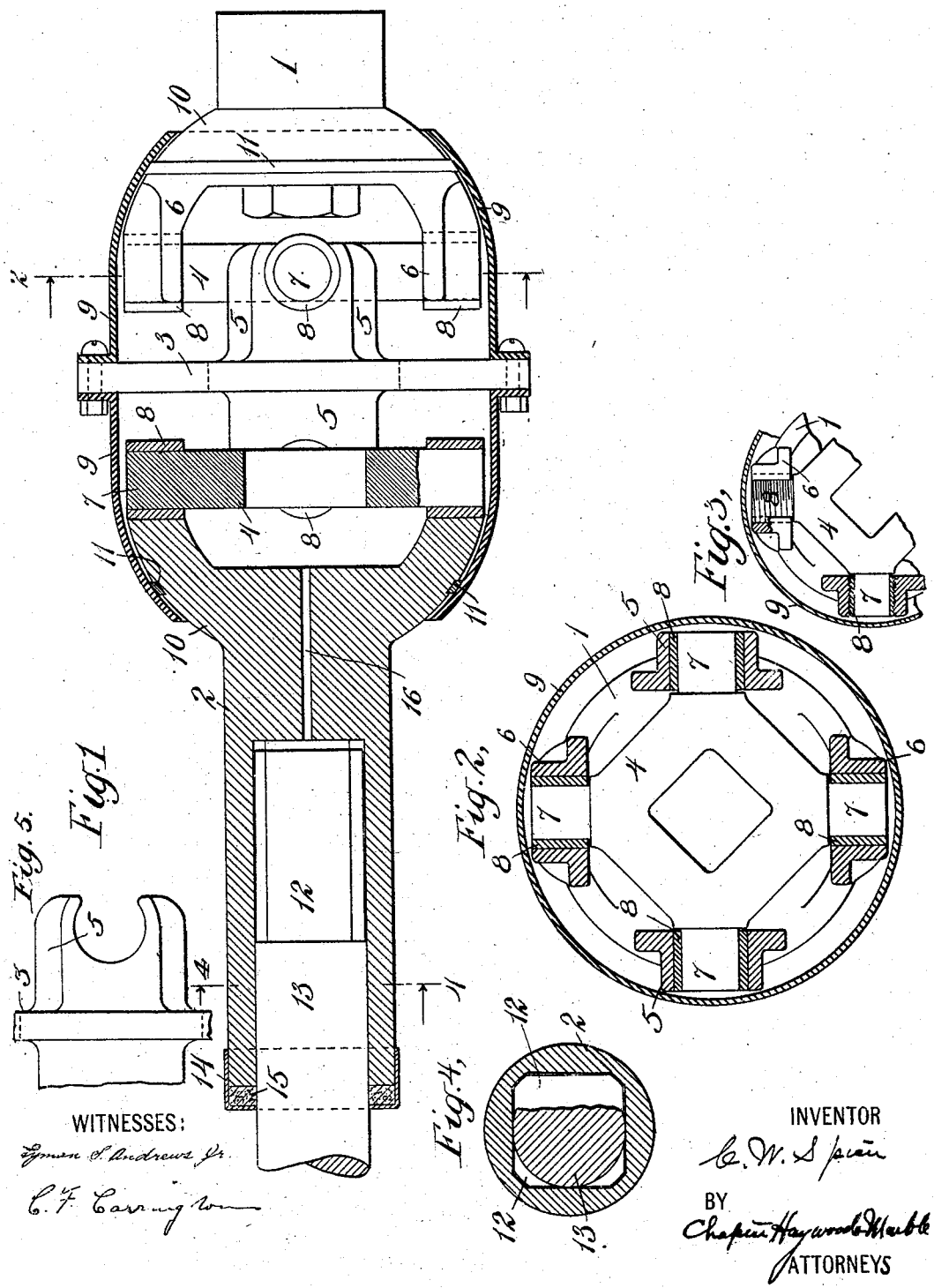

CLARENCE W. SPICER, OF PLAINFIELD, NEW JERSEY.

POWER-TRANSMITTING DEVICE.

No. 806,592.  Specification of Letters Patent.  Patented Dec. 5, 1905.

Application filed November 5, 1904. Serial No. 231,502.

*To all whom it may concern:*

Be it known that I, CLARENCE W. SPICER, a citizen of the United States, residing at Plainfield, in the county of Union and State of New Jersey, have invented certain new and useful Improvements in Power-Transmitting Devices; and I do hereby declare the following to be a full, clear, and exact description of the invention, such as will enable others skilled in the art to which it appertains to make and use the same.

My invention relates to improvements in universal joints and casings therefor, also to slip-joints designed to be used in connection with universal joints, and comprises a particular application of the improved incased universal joint covered by United States Letters Patent No. 768,407, granted to me on August 23, 1904.

My invention consists in two complete universal joints connected to transmit motion from one to the other and located within a single inclosing casing, in the novel construction of the bearings of such joints, in the novel means employed for lubricating a slip-joint employed in connection with a universal joint, and in other features of construction and arrangement hereinafter described, and particularly pointed out in the claims.

The objects of my invention are to produce in a single structure a universal joint which will cause both driving and driven members to revolve at the same angular speed; to provide a universal joint which will permit the driving and driven members to run out of line; to inclose such joints completely, thereby preventing the entrance of dust and dirt and retaining lubricant; to facilitate assembling and taking apart of the joints; to obtain great strength in proportion to weight; to make the number of parts small; to lubricate efficiently a slip-joint employed in connection with a universal joint when such slip-joint is used, and generally to make the whole structure simple, compact, durable, and relatively inexpensive.

I will now proceed to describe my invention with reference to the accompanying drawings, illustrating one embodiment of my invention, and will then point out the novel features in claims.

In the said drawings, Figure 1 shows a central longitudinal section of a double-incased universal joint and slip-joint constructed in accordance with my invention. Fig. 2 shows a transverse section of the universal joint through the center line of one of the trunnion-blocks. Fig. 3 is a detail view showing how the journals of the trunnion-block are introduced into the horns of the universal joint. Fig. 4 shows a cross-section through the slip-joint shown in Fig. 1; and Fig. 5 shows a detail side view of one of the said horns, the corresponding bearing bushing and journal having been removed.

In the said drawings numerals 1 and 2 designate two shafts or rotary members, of which either may be the driving member and the other the driven member.

3 designates a disk intermediate members 1 and 2.

4 4 designate two trunnion-blocks on opposite sides of the disk 3, respectively.

5 5 designate horns projecting from the two sides of disk 3, and 6 6 horns projecting from members 1 and 2.

The trunnion-blocks have trunnions or journals 7 7, fitting within bearing-bushings 8 8, located in sockets formed in the said horns 5 5 and 6 6. Each trunnion-block is by the construction described pivotally connected both to the disk 3 and to one of the two shafts 1 and 2, the axis of its pivotal connection to the shaft being at right angles to the axis of its pivotal connection to the disk 3. The construction just described constitutes, therefore, two complete universal joints, one connecting shaft 1 and disk 3, the other connecting shaft 2 and disk 3.

It is well known that a single universal joint transmitting motion from one rotary member to another located at an angle with respect to the first does not drive the second or driven member with uniform angular velocity as compared with the driving member, although the number of revolutions within a unit of time are necessarily the same, but that this may be corrected by driving from one universal joint through a second universal joint to the driven member. The construction above described combines the two joints necessary for correct driving in a single structure and permits them to be inclosed by a single casing, so as to be protected from dust and dirt, and to be lubricated by lubricant contained within such casing. The said casing comprises two members 9 9, secured to opposite sides of disk 3 and spherically curved near their outer ends, and the shaft members 1 and 2 are provided with spherically-curved surfaces 10, coacting with the similar surfaces of the casing members and serving to close the openings in the end of said casing members, while permitting considerable angular movement of each shaft with respect to disk 3 and with respect to the other shaft. Suitable packing material 11 may be interposed between the adjacent surfaces of the casing members and shafts, by which packing dust, dirt, and moisture is excluded and the casing is enabled to serve as a receptacle for lubricant, by which the wearing-surfaces of the joints will be kept thoroughly lubricated and wear of such parts thereby reduced to a minimum. The double universal joint has the further advantage that shafts 1 and 2 may be out of line—i. e., in different planes—without interference with the transmission of power from one to the other and without binding at the bearings. This is a matter of importance, particularly when the joint is to be used in automobile transmission mechanism, for in such mechanism warping of the frame of the vehicle, such as will throw the driving and driven shafts out of line, is apt to occur.

One important feature of my invention resides in the means for assembling the parts 1, 2, 3, and 4 without the use of bolts or nuts. For this purpose I do not provide the bearing-surfaces for the journals of the trunnion-blocks in the horns 5 and 6 themselves, but provide sockets in such horns to receive bearing-bushings 8, as above described, said sockets adapted to receive the bushings axially and having in their sides openings just wide enough to permit the lateral passage of the journals 7, but too narrow to permit the lateral passage of the said bearing-bushings. In assembling the parts the trunnion-blocks are first put in place with respect to the disk 3, their journal-pins being passed through the said openings in the sides of the sockets of the horns 5 into said sockets. The corresponding bearing-bushings 8 are then slipped over the ends of said journals and pressed home into the corresponding sockets in horns 5, thus securely connecting the trunnion-blocks to disk 3. The shafts 1 and 2 are then connected to the trunnion-blocks in similar fashion, and the casing members 9 are put in place and secured to the disk 3 by screws or similar convenient fastening means. In this way the use of screws, nuts, and the like within the casing is avoided.

Slip-joints are commonly provided in connection with universal joints, and in the drawings I show such a slip-joint combined structurally with the universal joint, so as to cooperate therewith. Said slip-joint consists of a socket-piece, which in the construction shown is the shaft 2 of the universal joint, said shaft or socket-piece having formed in it a substantially rectangular bore, in which works the shaft 12, the end of which is of corresponding rectangular section. In the construction of slip-joint shown entrance of dirt and dust into such joint is prevented by packing material 15 working over a cylindrical portion 13 of the shaft 12, said packing material being held in place by a retaining-ring 14. One feature of my invention resides in means whereby the slip-joint is lubricated automatically and whereby the casing of the universal joint serves as a reservoir for supplying lubricant to the slip-joint. For supplying lubricant the socket 2 is provided with a duct 16, connecting the interior of the universal-joint casing with the interior of said slip-joint. The shaft 12 in its motion back and forth acts as a piston to draw oil from the universal-joint casing into the slip-joint, thus keeping said joint lubricated at all times.

In another application for Letters Patent, filed October 4, 1905, Serial No. 281,254, I have claimed a slip-joint such as illustrated herein provided with packing material; also, a slip-joint the bore of which is so connected to an incased universal joint that the casing thereof forms a reservoir for lubricant for the slip-joint as well. Therefore such inventions are not claimed herein. The particular construction for lubricating the slip-joint illustrated and described herein and comprising the duct 16 is specifically different from the construction illustrated and claimed specifically in such other application, Serial No. 281,254, and therefore the construction comprising the duct 16 is claimed herein.

The trunnion-block 4 illustrated herein is a one-piece block possessing important advantages, and said trunnion-block is claimed in another application for Letters Patent, filed October 4, 1905, Serial No. 281,253, and therefore said trunnion-block is not claimed herein.

What I claim is—

1. In an incased universal-joint power-transmitting device, the combination with two universal joints connected to transmit power from one to the other, of a single casing inclosing both said joints and arranged to permit angular movement, with respect to each other, of the driving and driven members of the device, said driving and driven members provided with means substantially closing the ends of the casing.

2. In an incased universal-joint power-transmitting device, the combination with two universal joints connected to transmit power from one to the other, and one provided with a driving member and the other with a driven member, of a single casing inclosing both said joints and provided with openings through which said driving and driven members project, and with spherically-curved surfaces in the vicinity of such openings, said driving and driven members having corresponding spherically-curved portions closing the said openings in the casing.

3. In an incased universal-joint power-transmitting device, the combination of a disk, driving and driven members, and two trunnion-blocks, located substantially as described, on opposite sides of said disk and pivotally connected thereto, one trunnion-block also pivotally connected to the driving member about an axis at right angles to the axis of its pivotal connection to the disk, the other trunnion-block similarly pivotally connected to the driven member.

4. In an incased universal-joint power-transmitting device, the combination of a disk, driving and driven members, two trunnion-blocks, located substantially as described, on opposite sides of said disk and pivotally connected thereto, one trunnion-block also pivotally connected to the driving member about an axis at right angles to the axis of its pivotal connection to the disk, the other trunnion-block similarly pivotally connected to the driven member, and a single casing inclosing both universal joints thereby formed.

5. In an incased universal-joint power-transmitting device, the combination of a disk, driving and driven members, two trunnion-blocks, located on opposite sides of said disk and pivotally connected thereto, one trunnion-block also pivotally connected to the driving member about an axis at right angles to the axis of its pivotal connection to the disk, the other trunnion-block similarly pivotally connected to the driven member, and a single casing secured to the disk and inclosing both universal joints formed by the disk, trunnion-blocks, and driving and driven members, said casing having openings through which said driving and driven members project and spherically-curved surfaces in the vicinity of such openings, said driving and driven members having corresponding spherically-curved portions closing said openings in the casing.

6. In a universal joint, the combination of an intermediate or trunnion member and two end or driving and driven members, said members comprising journals and bearing-sockets open at the side to permit the lateral passage of said journals, and bearing-bushings fitting over and surrounding said journals and fitting into said sockets, said bushings of greater diameter than the openings in the sides of said sockets, but adapted to be introduced axially into said sockets and over said journals.

7. In a universal joint, the combination of an intermediate or trunnion member and two end or driving and driven members, said trunnion member comprising journals and said driving and driven members having projecting horns containing bearing-sockets, said sockets open at the sides to permit the introduction of said journals laterally, and bearing-bushings fitting over and surrounding said journals and fitting into said sockets, said bushings of greater diameter than the openings in the sides of said sockets, but adapted to be introduced axially into said sockets and over said journals.

8. In a universal joint, the combination with an intermediate or trunnion member and two end or driving and driven members, said members comprising journals and bearing-sockets open at the side to permit the lateral passage of said journals, and bearing-bushings fitting over and surrounding said journals and fitting into said sockets, said bushings of greater diameter than the openings in the sides of said sockets, but adapted to be introduced axially into said sockets and over said journals, of a casing inclosing said members.

9. The combination, with an incased universal joint, comprising a casing forming a reservoir for lubricant and driving and driven members, one of said members having a socket, of a shaft fitting within said socket and free to move axially within the same but having a driving connection therewith, said socketed member having an oil-duct connecting the interior of the socket with the interior of said casing.

In testimony whereof I have hereunto affixed my signature in the presence of two witnesses.

CLARENCE W. SPICER.

Witnesses:
   G. H. UNDERHILL,
   ASA F. RANDOLPH.